United States Patent
Acharjee et al.

(10) Patent No.: US 11,336,507 B2
(45) Date of Patent: May 17, 2022

(54) ANOMALY DETECTION AND FILTERING BASED ON SYSTEM LOGS

(71) Applicant: Cisco Technology, Inc., San Jose, CA (US)

(72) Inventors: Prasenjeet Acharjee, Bangalore (IN); Subramanian Karunanithi, Chennai (IN); Lavan K. Peechara, Bangalore (IN); Bhavadharini Krishnamoorthy, Sivagiri (IN); Togis Thomas, Kottayam (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/039,529

(22) Filed: Sep. 30, 2020

(65) Prior Publication Data

US 2022/0103418 A1   Mar. 31, 2022

(51) Int. Cl.
*H04L 12/24* (2006.01)
*G06N 20/00* (2019.01)
*H04L 41/0631* (2022.01)
*H04L 41/069* (2022.01)
*H04L 41/0604* (2022.01)

(52) U.S. Cl.
CPC ......... *H04L 41/0631* (2013.01); *G06N 20/00* (2019.01); *H04L 41/069* (2013.01); *H04L 41/0627* (2013.01)

(58) Field of Classification Search
CPC ............. H04L 41/0631; H04L 41/0627; H04L 41/069; G06N 20/00
USPC ....................................................... 709/224
See application file for complete search history.

(56) References Cited

U.S. PATENT DOCUMENTS

| | | | |
|---|---|---|---|
| 8,209,567 B2 * | 6/2012 | Cohen | G06F 16/285 714/45 |
| 9,092,802 B1 * | 7/2015 | Akella | G06Q 30/0256 |
| 9,229,800 B2 * | 1/2016 | Jain | G06N 5/022 |
| 10,354,204 B2 * | 7/2019 | Chen | G06K 9/6223 |
| 10,445,668 B2 * | 10/2019 | Oehrle | G06Q 10/063 |
| 10,552,727 B2 * | 2/2020 | Caspi | G06N 3/0445 |
| 10,552,728 B2 * | 2/2020 | Oliner | G06F 40/274 |

(Continued)

OTHER PUBLICATIONS

Sepp Hochreiter; Jurgen Schmidhuber (1997). "Long short-term memory". Neural Computation. 9 (8): 1735-1780. (Year: 1997).*

(Continued)

*Primary Examiner* — Melvin H Pollack
(74) *Attorney, Agent, or Firm* — Patterson + Sheridan, LLP (57) ABSTRACT

Anomaly detection and filtering based on system logs is provided via receiving, at a first time, a first sequence of log entries from a networked system; generating, based on previously observed log entries including the first sequence of log entries, predicted log entries for a second time; receiving, at the second time, a second sequence of log entries from the networked system; determining whether the second sequence is anomalous based on comparing the second sequence with the predicted log entries; in response to determining that the second sequence is anomalous, determining whether the second sequence is noteworthy based on a function entropy of the first sequence and a sentiment polarity of the second sequence; and in response to determining that the second sequence is noteworthy, generating an anomaly report that includes the second sequence and a root cause.

20 Claims, 5 Drawing Sheets

(56) References Cited

U.S. PATENT DOCUMENTS

| | | | | |
|---|---|---|---|---|
| 10,594,715 | B2* | 3/2020 | Fadlil | G16H 40/20 |
| 10,616,257 | B1* | 4/2020 | Soulhi | H04L 41/5009 |
| 10,673,880 | B1* | 6/2020 | Pratt | H04L 63/1425 |
| 10,706,229 | B2* | 7/2020 | Xu | G06F 40/216 |
| 10,756,949 | B2* | 8/2020 | Kulshreshtha | H04L 41/0622 |
| 10,762,563 | B2* | 9/2020 | Belanger | G06N 20/00 |
| 10,788,954 | B1* | 9/2020 | Martin | H04L 41/22 |
| 10,878,505 | B1* | 12/2020 | Blair | G06N 20/00 |
| 10,880,321 | B2* | 12/2020 | Silver | G06N 20/00 |
| 10,922,604 | B2* | 2/2021 | Zhao | G06N 3/0445 |
| 10,949,750 | B2* | 3/2021 | Thornton | H04L 41/0654 |
| 10,956,808 | B1* | 3/2021 | Bhardwaj | G06N 3/0472 |
| 10,965,553 | B2* | 3/2021 | Richardson | H04L 43/04 |
| 10,997,009 | B2* | 5/2021 | Poghosyan | G06F 11/0709 |
| 11,023,295 | B2* | 6/2021 | Ding | G06N 3/088 |
| 11,200,156 | B2* | 12/2021 | Rivoir | G06F 11/3684 |
| 2013/0231920 | A1* | 9/2013 | Mathew | G06F 40/237 704/9 |
| 2013/0325877 | A1* | 12/2013 | Niazi | G06Q 30/0203 707/748 |
| 2018/0165554 | A1* | 6/2018 | Zhang | G06K 9/6256 |
| 2018/0203754 | A1* | 7/2018 | Beohar | G06F 11/0709 |
| 2019/0121350 | A1* | 4/2019 | Celia | H04L 67/12 |
| 2019/0243743 | A1* | 8/2019 | Saxena | G06F 11/0766 |
| 2019/0349321 | A1* | 11/2019 | Cai | G06F 40/237 |
| 2019/0356553 | A1* | 11/2019 | Mermoud | G06K 9/6268 |
| 2019/0379589 | A1* | 12/2019 | Ryan | G06N 3/082 |
| 2019/0391574 | A1* | 12/2019 | Cheng | G05B 23/024 |
| 2020/0059484 | A1* | 2/2020 | Rhee | G05B 19/4186 |
| 2020/0074275 | A1* | 3/2020 | Xia | G06F 16/2365 |
| 2020/0167787 | A1* | 5/2020 | Kursun | G06F 16/9024 |
| 2020/0184155 | A1* | 6/2020 | Mehta | H04L 41/16 |
| 2020/0210393 | A1* | 7/2020 | Beaver | G06F 17/18 |
| 2020/0242483 | A1* | 7/2020 | Shashikant Rao | G06N 5/022 |
| 2020/0250559 | A1* | 8/2020 | Dinh | G06N 5/003 |
| 2020/0252281 | A1* | 8/2020 | Abhyankar | G06F 16/24556 |
| 2020/0257964 | A1* | 8/2020 | Caelen | G06F 21/31 |
| 2020/0258013 | A1* | 8/2020 | Monnett | G06Q 30/016 |
| 2020/0274783 | A1* | 8/2020 | Sharma | H04L 43/10 |
| 2020/0286469 | A1* | 9/2020 | Freeman | G06F 40/20 |
| 2020/0293653 | A1* | 9/2020 | Huang | G06N 3/0454 |
| 2020/0294528 | A1* | 9/2020 | Perri | H04M 3/5175 |
| 2020/0314101 | A1* | 10/2020 | Zhang | H04L 63/1433 |
| 2020/0319857 | A1* | 10/2020 | Lonial | G06F 8/34 |
| 2020/0348662 | A1* | 11/2020 | Cella | G05B 23/024 |
| 2020/0371512 | A1* | 11/2020 | Srinivasamurthy | G05B 23/0281 |
| 2020/0387797 | A1* | 12/2020 | Ryan | G06N 3/088 |
| 2021/0004682 | A1* | 1/2021 | Gong | G06F 16/9536 |
| 2021/0014103 | A1* | 1/2021 | Zhang | H04L 41/0631 |
| 2021/0014260 | A1* | 1/2021 | Singh | H04L 41/16 |
| 2021/0019630 | A1* | 1/2021 | Yao | G06K 9/6257 |
| 2021/0021494 | A1* | 1/2021 | Yao | H04L 41/5009 |
| 2021/0042605 | A1* | 2/2021 | Song | G06K 9/6256 |
| 2021/0080928 | A1* | 3/2021 | Mihnev | G05B 23/0221 |
| 2021/0081819 | A1* | 3/2021 | Polleri | G06F 40/40 |
| 2021/0089860 | A1* | 3/2021 | Heere | G06N 20/00 |
| 2021/0097605 | A1* | 4/2021 | Yeri | G06F 16/24575 |
| 2021/0117868 | A1* | 4/2021 | Sriharsha | G06F 17/18 |
| 2021/0157834 | A1* | 5/2021 | Sivasubramanian | G10L 15/1815 |
| 2021/0185066 | A1* | 6/2021 | Shah | G06N 20/10 |
| 2021/0241289 | A1* | 8/2021 | Roy | G06N 20/00 |
| 2021/0295183 | A1* | 9/2021 | Joy | G06N 5/04 |
| 2021/0297305 | A1* | 9/2021 | Si | H04L 41/0631 |

OTHER PUBLICATIONS

Malhotra, Pankaj; Vig, Lovekesh; Shroff, Gautam; Agarwal, Puneet (Apr. 2015). "Long Short Term Memory Networks for Anomaly Detection in Time Series". European Symposium on Artificial Neural Networks, Computational Intelligence and Machine Learning—ESANN 2015. (Year: 2015).*

Ribeiro, Filipe Nunes; Araujo, Matheus (2010). "A Benchmark Comparison of State-of-the-Practice Sentiment Analysis Methods". Transactions on Embedded Computing Systems. 9 (4). (Year: 2010).*
Vryniotis, Vasilis (2013). The importance of Neutral Class in Sentiment Analysis. (Year: 2013).*
Amir Farzad, T. Aaron Gulliver, Unsupervised log message anomaly detection, ICT Express, vol. 6, Issue 3, 2020, pp. 229-237. (Year: 2020).*
Andy Brown, Aaron Tuor, Brian Hutchinson, and Nicole Nichols. 2018. Recurrent Neural Network Attention Mechanisms for Interpretable System Log Anomaly Detection. Proceedings of the First Workshop on Machine Learning for Computing Systems (MLCS'18). Association for Computing Machinery, Article 1, 1-8. (Year: 2018).*
Min Du, Feifei Li, Guineng Zheng, and Vivek Srikumar. 2017. DeepLog: Anomaly Detection and Diagnosis from System Logs through Deep Learning. <i>Proceedings of the 2017 ACM SIGSAC Conference on Computerand Communications Security</i>. Association for Computing Machinery, New York, NY, USA, 1285-1298. (Year: 2017).*
X. Xia, W. Zhang and J. Jiang, "Ensemble Methods for Anomaly Detection Based on System Log," 2019 IEEE 24th Pacific Rim International Symposium on Dependable Computing (PRDC), 2019, pp. 93-931, doi: 10.1109/PRDC47002.2019.00034. (Year: 2019).*
H. Studiawan, F. Sohel and C. Payne, "Anomaly Detection in Operating System Logs with Deep Learning-Based Sentiment Analysis," in IEEE Transactions on Dependable and Secure Computing, vol. 18, No. 5, pp. 2136-2148, Sep. 1-Oct. 2021, doi: 10.1109/TDSC.2020.3037903. (Year: 2021).*
K. A. Alharthi, A. Jhumka, S. Di, F. Cappello and E. Chuah, "Sentiment Analysis based Error Detection for Large-Scale Systems," 2021 51st Annual IEEE/IFIP International Conference on Dependable Systems and Networks (DSN), 2021, pp. 237-249, doi: 10.1109/DSN48987.2021.00037. (Year: 2021).*
Yoshiki Kanda, Romain Fontugne, Kensuke Fukuda, Toshiharu Sugawara, ADMIRE: Anomaly detection method using entropy-based PCA with three-step sketches, Computer Communications, vol. 36, Issue 5, 2013, pp. 575-588. (Year: 2013).*
George Nychis, Vyas Sekar, David G. Andersen, Hyong Kim, and Hui Zhang. 2008. An empirical evaluation of entropy-based traffic anomaly detection. Proceedings of the 8th ACM SIGCOMM conference on Internet measurement ( IMC '08). Association for Computing Machinery, New York, NY, USA, 151-156. (Year: 2008).*
Bereziński P., Szpyrka M., Jasiul B., Mazur M. (2014) Network Anomaly Detection Using Parameterized Entropy. In: Saeed K., Snášel V. (eds) Computer Information Systems and Industrial Management. CISIM 2015. Lecture Notes in Computer Science, vol. 8838. Springer, Berlin. (Year: 2015).*
M. Banton, N. Shone, W. Hurst and Q. Shi, "A Fresh Look at Combining Logs and Network Data to Detect Anomalous Activity," 2019 International Conference on Information and Communication Technologies for Disaster Management (ICT-DM), 2019, pp. 1-6, doi: 10.1109/ICT-DM47966.2019.9032959. (Year: 2019).*
Marcello Cinque, Domenico Cotroneo, and Antonio Pecchia. 2013. Event logs for the analysis of software failures: A rule-based approach. IEEE Transactions on Software Engineering (TSE) (2013), 806-821. [Abstract Only].
Stephen E Hansen and E Todd Atkins. 1993. Automated System Monitoring and Notification with Swatch . . . In Proc. Large Installation System Administration Conference (LISA). 145-152.
Alina Oprea, Zhou Li, Ting-Fang Yen, Sang H Chin, and Sumayah Alrwais. 2015. Detection of early-stage enterprise infection by mining large-scale log data. In Proc. International Conference on Dependable Systems and Networks (DSN). 45-56.
James E Prewett. 2003. Analyzing cluster log files using Logsurfer. In Proc. Annual Conference on Linux Clusters.
John P Rouillard. 2004. Real-time Log File Analysis Using the Simple Event Correlator (SEC) . . . In Proc. Large Installation System Administration Conference (LISA) 133-150.
Sudip Roy, Arnd Christian Konig, Igor Dvorkin, and Manish Kumar. 2015. Per-faugur: Robust diagnostics for performance anomalies in cloud services. In Proc. IEEE International Conference on Data Engineering (ICDE). IEEE, 1167-1178.

(56) References Cited

OTHER PUBLICATIONS

Kenji Yamanishi and Yuko Maruyama. 2015. Dynamic syslog mining for network failure monitoring. In Proc. ACM SIGKDD International Conference on Knowledge Discovery and Data Mining (SIGKDD). 499-508.
Ting-Fang Yen, Alina Oprea, Kaan Onarlioglu, Todd Leetham, William Robertson, Ari Juels, and Engin Kirda. 2013. Beehive: Large-scale log analysis for detecting suspicious activity in enterprise networks. In Proc. International Conference on Dependable Systems and Networks (ACSAC). 199-208.
Wei Xu, Ling Huang, Armando Fox, David Patterson, and Michael I Jordan. 2009. Detecting large-scale system problems by mining console logs. In Proc. ACM Symposium on Operating Systems Principles (SOSP). 117-132. [Abstract Only].
Jian-Guang Lou, Qiang Fu, Shengqi Yang, Jiang Li, and Bin Wu. 2010. Mining program workflow from interleaved traces. In Proc. ACM SIGKDD International Conference on Knowledge Discovery and Data Mining (SIGKDD). [Abstract Only].
Xiao Yu, Pallavi Joshi, Jianwu Xu, Guoliang Jin, Hui Zhang, and Guofei Jiang. 2016. CloudSeer: Workflow Monitoring of Cloud Infrastructures via Interleaved Logs. In Proc. ACM International Conference on Architectural Support for Programming Languages and Operating Systems (ASPLOS). 489-502.
Marc-Andre Zoller, Marcus Baum, Marco F. Huber: Framework for Mining Event Correlations and Time Lags in Large Event Sequence (available at: https://ieeexplore.ieee.org/document/8104876) [Abstract Only].

\* cited by examiner

ANOMALY DETECTION AND FILTERING BASED ON SYSTEM LOGS

TECHNICAL FIELD

Embodiments presented in this disclosure generally relate to network anomaly detection. More specifically, embodiments disclosed herein provide for anomaly detection and filtering based on system logs.

BACKGROUND

In a network environment, various systems and devices run various applications that communicate with other applications running on remote systems and devices. The behavior of these applications influences the operations of the underlying devices, and when an application operates in unexpected ways (e.g., due to a malfunction, bug in the software, or malicious application), the operations of the network environment can be disturbed. Accordingly, operators of network environments can keep logs of the behaviors of the applications accessing the network to thereby identify and troubleshoot a root cause for aberrant behavior on the network.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a method for anomaly detection and filtering based on system logs that includes: receiving, at a first time, a first sequence of log entries from a networked system; generating, based on previously observed log entries including the first sequence of log entries, predicted log entries for a second time; receiving, at the second time, a second sequence of log entries from the networked system; determining whether the second sequence is anomalous based on comparing the second sequence with the predicted log entries; in response to determining that the second sequence is anomalous, determining whether the second sequence is noteworthy based on a function entropy of the first sequence and a sentiment polarity of the second sequence; and in response to determining that the second sequence is noteworthy, generating an anomaly report that includes the second sequence and a root cause.

One embodiment presented in this disclosure is a system that includes: a processor; and a memory including instructions that when executed by the processor perform an operation comprising: receiving, at a first time, a first sequence of log entries from a networked system; generating, based on previously observed log entries including the first sequence of log entries, predicted log entries for a second time; receiving, at the second time, a second sequence of log entries from the networked system; determining whether the second sequence is anomalous based on comparing the second sequence with the plurality of predicted log entries; in response to determining that the second sequence is anomalous, determining whether the second sequence is noteworthy based on a function entropy of the first sequence and a sentiment polarity of the second sequence; and in response to determining that the second sequence is noteworthy, generating an anomaly report that includes the second sequence and a root cause.

One embodiment presented in this disclosure is a device including computer-readable instructions that when executed by a processor enable performance of an operation comprising: receiving, at a first time; a first sequence of log entries from a networked system; generating, based on previously observed log entries including the first sequence of log entries, predicted log entries for a second time; receiving, at the second time, a second sequence of log entries from the networked system; determining whether the second sequence is anomalous based on comparing the second sequence against the predicted log entries; in response to determining that the second sequence is anomalous, determining whether the second sequence is noteworthy based on a function entropy of the first sequence and a sentiment polarity of the second sequence; and in response to determining that the second sequence is noteworthy, generating an anomaly report that includes the second sequence and a root cause.

EXAMPLE EMBODIMENTS

The present disclosure provides for a real-time monitoring of network traffic passing through an event-logging device (whether performed on-device or offloaded to one or more other networked devices) that uses an unsupervised machine learning model to identify and report network events that are both anomalous and noteworthy to the network operators. Because log data are unstructured, and the format and semantics thereof can vary significantly from system to system, it is challenging to diagnose a problem using unstructured logs even after knowing an error has occurred. Additionally, troubleshooting is often performed after an aberration has caused significant problems in the network environment, and voluminous logs are time consuming and complex to examine. Although rule-based approaches can address known issues when specific domain knowledge of those issues exist, detecting and handling unknown anomalies remains challenging. Compounding these challenges, not all anomalies relate to issues that require solutions or the attention of a network.

By observing the log entries as a sequence of events, and using the prior history of the network, the present disclosure allows for a machine learning model to be developed to identify anomalous and noteworthy events occurring on the network in real time. The machine learning model observes operations of the network to continuously learn what "normal" network behavior should look like as network conditions change over time. Log entries are stored in a "dictionary" of what constitutes a normal template for various log entries and the machine learning model develops a "grammar" for how the different log entries observed at different times are related to one another. When a log entry does not match the expected grammar, based on a sequence of previously observed log entries, the machine learning model marks the log entry as anomalous. Further post processing and filtering is used to determine whether the contents of the anomalous log entry are noteworthy so that noteworthy anomalies are elevated to the attention of a network operator and non-noteworthy anomalies are ignored. Accordingly, the present disclosure provides for improvements in the efficiency and accuracy of reporting network anomalies, and reduces the incidence of false positive or extraneous anomaly reports, among other benefits.

The present disclosure may be deployed on a networking device, such as a muxponder or router that processes various events, or in association with several networking devices with a cloud-based or centralized collector that analyzes the network events for the several networking devices. When deployed locally on a system in the network (i.e., a networked system), the present disclosure localizes the detection of anomalous and noteworthy network events, and reduces the bandwidth requirements needed to send and receive data for centralized analysis thereof, among other benefits.

Figure 1:
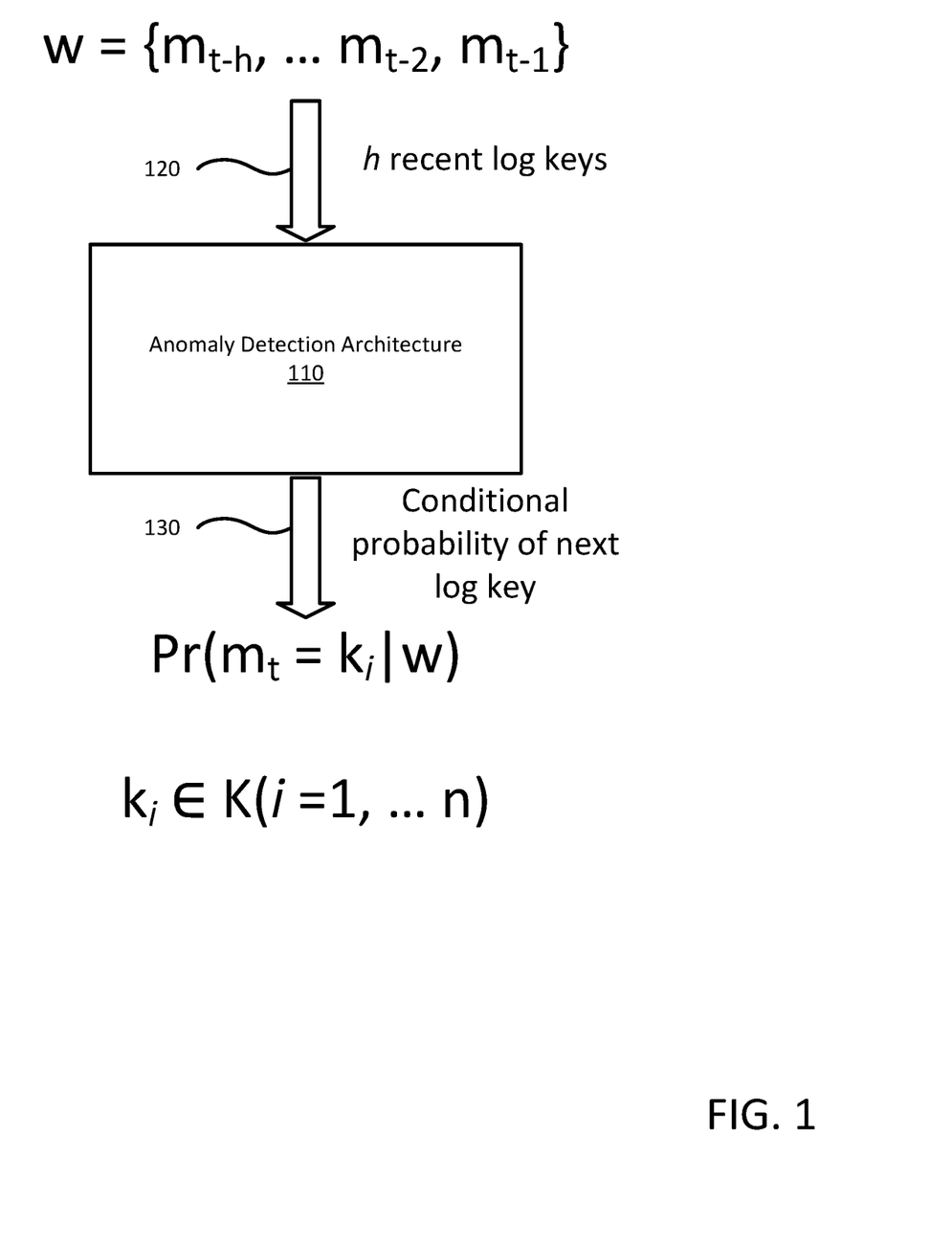
FIG. 1 illustrates operations of an anomaly detection architecture, according to embodiments of the present disclosure.

FIG. 1 illustrates operations of an anomaly detection architecture 110, according to embodiments of the present disclosure. The anomaly detection architecture 110 receives inputs 120 of the h most recent log keys up to time t−1 to generate an output 130 of the conditional probability of the next log key at time t.

Each log entry is parsed into a log key and a parameter vector value. The log key of a given log entry refers to the string constant from the print/output statement in the source code which generated the given log entry, and the parameter vector value includes one or more metrics for the log entry (e.g., source/destination addresses, file paths, or ports, message contents or topics, etc.) as well as timestamp of when the log entry was generated For example, where K is the set of distinct log keys $k_1$-$k_n$ from a log producing application, and $m_i$ denotes the value of the key observed at position i in a sequence of log keys, the anomaly detection architecture 110 monitors a window of the last h inputs 120 to develop a set w of the most recent log keys $m_{t-h}$ to $m_{t-1}$. Continuing the example, if the anomaly detection architecture 110 observes the sequence of $\{k_{22}, k_5, k_{11}, k_9, k_{11}, k_{26}\}$ and used a window of h=3, the anomaly detection architecture 110 can learn that the sequence $w_1$ of $\{k_{22}, k_5, k_{11}\}$ led to $k_9$, the sequence of $w_2$ of $\{k_5, k_{11}, k_9\}$ let to $k_{11}$, and the sequence of $w_3$ $\{k_{11}, k_9, k_{11}\}$ of led to $k_{26}$. Accordingly, the next time any of the sequences $w_1$, $w_2$, or $w_3$ are observed, the anomaly detection architecture 110 may expect to observe log keys of $k_9$, $k_{11}$, and $k_{26}$, respectively. As will be appreciated, the anomaly detection architecture 110 is trained using a lager data set than the current example, and thus can produce a more robust probability distribution Pr such that the probability of observing a given value of the key at time t (i.e., $m_t$) that can yield several probabilities for various potential key values. For example, after observing the sequence of w1, the probability p of seeing $k_1$ next is 0%, $k_2$ next is 2%, $k_3$ next is 20%, . . . $k_n$ next is 3%, based on previously observed network behaviors.

Figure 2:
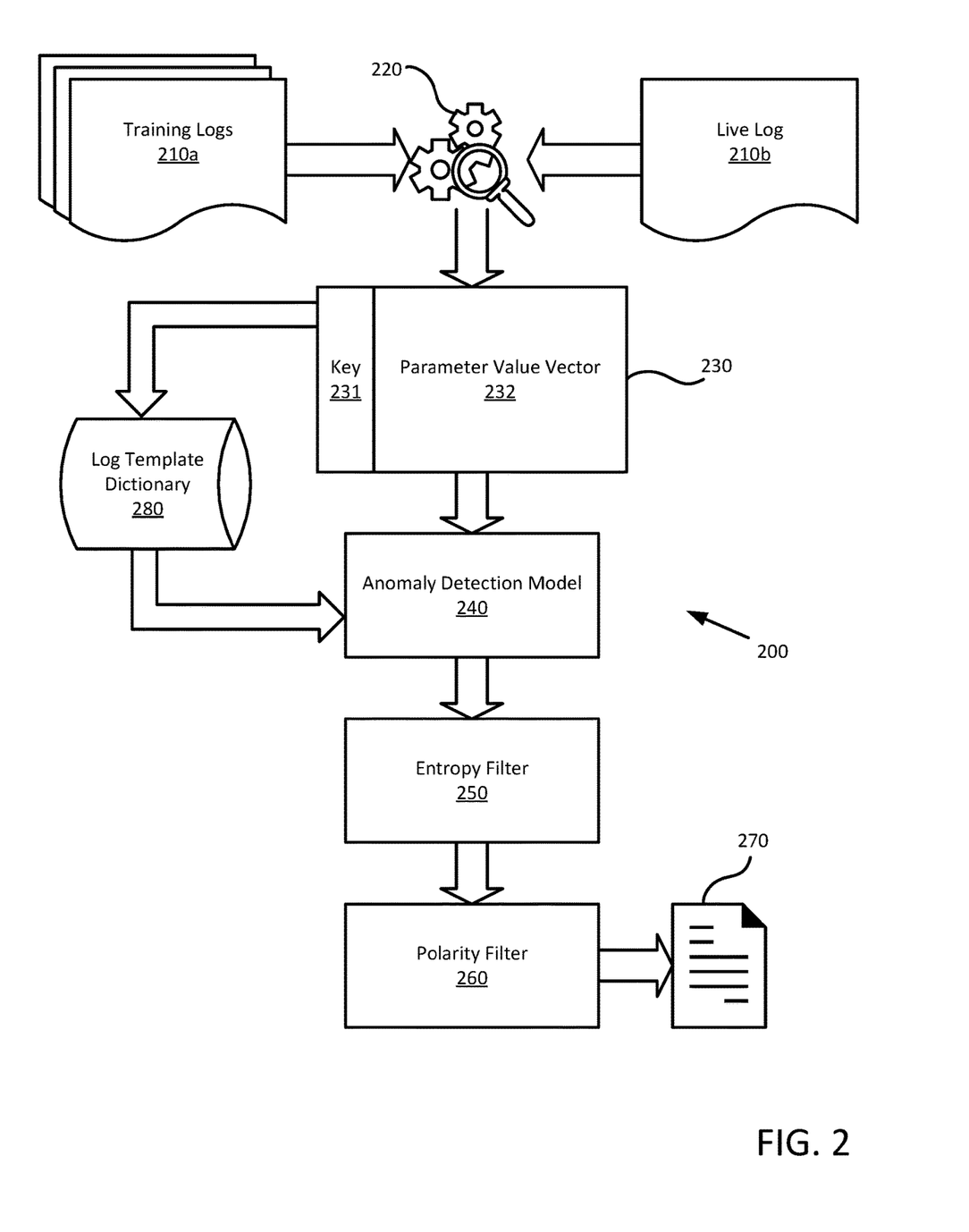
FIG. 2 illustrates a layout of a system for identifying noteworthy network anomalies, according to embodiments of the present disclosure.

FIG. 2 illustrates a layout of a system 200 for identifying noteworthy network anomalies, according to embodiments of the present disclosure. The system 200 takes training logs 210a or live logs 210b (generally, logs 210) as input to determine whether to produce an anomaly report 270 that identifies whether a given log 210 or set of logs 210 are anomalous as an output.

Figure 3:
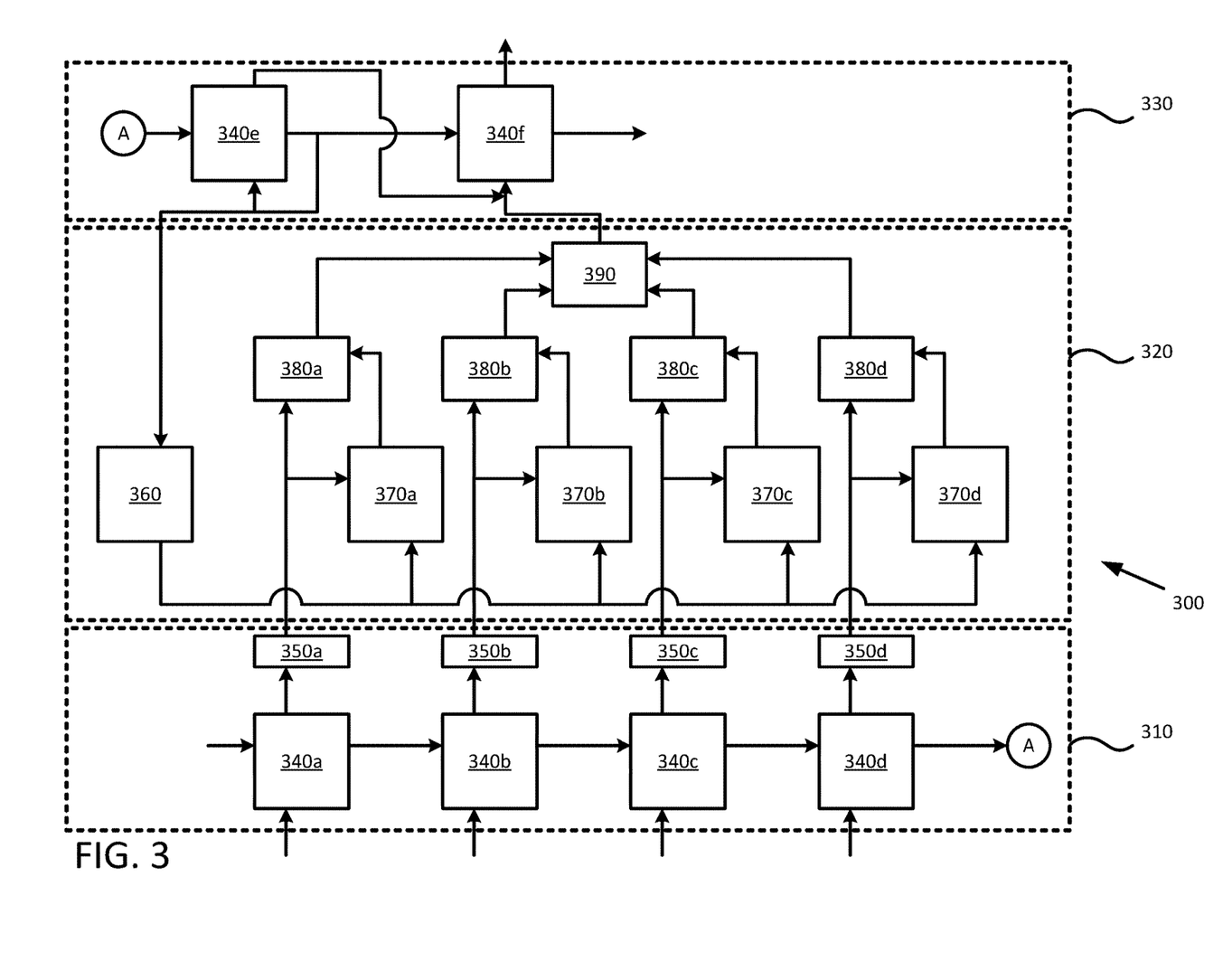
FIG. 3 illustrates a machine learning model applying Long Short-Term Memory with attention, according to embodiments of the present disclosure.

The training logs 210a are used during a training phase, in which an anomaly detection model 240, such as the anomaly detection architecture 110 of FIG. 1 or the machine learning model 300 of FIG. 3, is fitted to the to the network conditions and a dictionary of log templates is readied. The training logs 210a are unlabeled (i.e., the system 200 does not know a priori whether a given training log 210a is anomalous or noteworthy), and the anomaly detection model 240 instead observes normal operations to continuously learn what "normal" network behavior looks like as network conditions change over time. Training and fitting the anomaly detection model 240 results in a log template dictionary 280 that includes several examples of what constitutes a normal template for various log entries and defines a "grammar" for how the different log entries observed at different times are related to one another.

Once the training phase is complete, the live logs 210b from the system during normal operations are fed into the system 200 to determine whether the live logs 210b include anomalies, and whether those anomalies are noteworthy. By determining whether an anomalous log entry is noteworthy, the system 200 reduces the false positive rate of reporting, and identifies those anomalous log entries that are of actual interest to an operator, rather than identifying all anomalous events occurring on the network.

A parser 220 identifies the various entries in the logs 210 to identify the entries 230 via a key 231 and a parameter value vector 232 based on the text found in the original log 210 to streamline identification and processing of the logs 210. The key 231 for a given entry is a string constant from the print/output statement in the source code that produced the given entry. For example, a key 231 may identify that the given entry was produced by Function A that occurred on line B of the code. The parameter value vector 232 includes a timestamp of when the entry 230 was observed and one or more metric values related to the entry 230. For example, metric values can include source/destination addresses, file paths, or ports, message contents or topics, etc. to reflect the underlying system state and performance status in a digestible format.

As various templates of key 231 and parameter value vectors 232 are observed, the system 200 adds those templates to a log template dictionary 280 for use by the anomaly detection model 240 in identifying whether the live logs 210b are anomalous or noteworthy. During "live" operation after the fitting is initially complete, the log template dictionary 280 can be updated with more new "normal" templates which can include "rare" templates that were not seen as part of the initial training/fitting operations. By updating the log template dictionary 280 during operations of the system 200, false positive identification of non-anomalous events as anomalous is reduced, and the system 200 can evolve as the monitored network evolves.

The anomaly detection model 240 is fitted based on the training logs 210a to identify patterns in the network behavior as indicated in the logs 210. The anomaly detection model 240 determines whether a given log entry is anomalous as a seq2seq (sequence to sequence) prediction problem. Accordingly, the anomaly detection model 240 determines whether the live log 210b received at time $t_x$ is anomalous based on previously received live logs 210b received at times $t_{x-y}$ to $t_{x-1}$ that predict what the log data at time $t_x$ should look like based on previously observed patterns for normal network behavior. The live log 210a from time $t_x$ is compared against the predicted logs for time $t_x$ to identify any differences as anomalies. In various aspects, the predicted logs are pulled from the log template dictionary 280, and the anomaly detection model 240 selects the top-n most likely logs to follow the previously received live logs 210b from times $t_{x-y}$ up to time $t_{x-1}$. When the live log 210b from time $t_x$ matches one of the g predicted logs for time $t_x$, the anomaly detection model 240 determines that the live log 210b is not anomalous. When the live log 210b from time $t_x$ does not match one of the g predicted logs for time $t_x$, the anomaly detection model 240 determines that the live log 210b is anomalous.

As used herein, an anomaly is not necessarily good or bad. An anomaly may be an unusual, but benign, network condition or a new network condition that will develop into a predictable and non-anomalous network behavior, and is generally not of interest to a network operator. Similarly, an anomaly may be part of chain of anomalous behaviors over the network, and receiving multiple alerts based on the anomalous behavior can distract a network operator from more important (and different) anomalous network behaviors. Accordingly, the system 200 post-processes the anomalous logs 210 to identify those anomalous logs 210 that are noteworthy before including those logs 210 in an anomaly report 270.

An entropy filter 250 identifies anomalous logs 210 that were determined to be anomalous based on high-entropy prior logs 210. For example, when the set of logs 210 received from time $t_{x-y}$ to $t_{x-1}$ are themselves anomalous or the anomaly detection model 240 otherwise has low confidence in the accuracy of the predictions, the anomaly determination may be the result of high entropy and may be a false positive of an anomalous log entry or the result of a chain of anomalous log entries that have already been reported. Accordingly, the entropy filter 250 removes anomalous logs 210 that are not noteworthy so that those logs 210 are not included in the anomaly report 270.

A polarity filter 260 identifies the anomalous logs 210 that were determined to be anomalous, but do not describe negative events. Because the logs 210 include text of the events occurring over the network, the polarity filter 260 identifies key words or phrases in the logs 210 that are indicative of negative effects (e.g., violation, error, exception) or of positive effects (e.g., success, established, received) on the network. The logs 210 that describe positive events, although anomalous, are generally of less interest to network operators than logs 210 that describe negative events. Accordingly, the operator can set a sentiment threshold at which to indicate that a given log 210, although anomalous, expresses too positive of a sentiment to be noteworthy. The logs 210 that are too positive (or not negative enough) are thereby not included in the anomaly report 270.

The anomaly report 270 identifies the actual log entry from time $t_x$ that is identified to be both anomalous and noteworthy, as well as a root cause for the log entry from time $t_x$. In various embodiments, the system 200 identifies the log entries 210b received prior to time $t_x$ from the same application (or device) that was responsible for the anomalous log entry from time $t_x$, which may be included in the series of live logs 210b used to predict the log at time $t_x$ or earlier that the series of live logs 210b used to predict the log at time $t_x$.

It will be appreciated that some non-anomalous behaviors over the network can include known malicious behaviors that a network operator can automatically address (e.g., quarantining a sending device, redirecting malicious traffic for analysis, etc.). However, these known malicious behaviors can be addressed by automated systems and included in network health reports other than an anomaly report 270.

FIG. 3 illustrates a machine learning model 300 applying Long Short-Term Memory (LSTM) with attention, according to embodiments of the present disclosure. The machine learning model 300 can generally be understood as including three segments: an encoder layer 310, an attention layer 320, and a decoder layer 330. The machine learning model 300 is trained to maximize the probability of having $k_1 \in K$ as the next log key value as reflected by the training data sequence. In other words, the machine learning model 300 learns the probability distribution $Pr(m_t = m_{t-h}, \ldots, m_{t-2}, m_{t-1})$ that maximizes the probability of the training log key sequence. The training step entails finding proper assignments to the weights so that the final output of the sequence of LSTMs produces the desired label (output) that comes with inputs in the training data set. During the training process, each input/output pair incrementally updates these weights, through loss minimization via gradient descent.

The encoder layer 310 is an LSTM network that receives preprocessed data via an input tree, and includes h LSTM cells 340. As discussed herein, an input to the machine learning model 300 consists of a window w of h log keys. As shown in FIG. 3, the machine learning model 300 is configured to accept an input window w where h=5 via five LSTM cells 340a-e, although larger or smaller windows can be used in other embodiments with corresponding larger or smaller numbers of LSTM cells 340. In one example, the encoder layer 310 receives an input of the window w of $\{k_{22}, k_5, k_{11}, k_9, k_{11}\}$ such that respective input gates of the first LSTM cell 340a receives $k_{22}$, the second LSTM cell 340b receives $k_5$, the third LSTM cell 340c receives $k_{11}$, and the fourth LSTM cell 340d receives $k_9$ (the last value $k_{11}$ in the window w is provided to a fifth LSTM cell 340e in the decoder layer 330). The output gates of the LSTMs cells 340a-d provide a corresponding encoder hidden state 350a-d that is fed into the attention layer 320. The output of the fifth LSTM cell 340e is provided to the attention layer 320 as a current decoder hidden state 360.

The attention layer 320 provides a vector representation based on the outputs of each LSTM cell 340 in the encoder layer 310 that provides the decoder layer 330 with information from every encoder hidden state 350 (e.g., global attention), which helps the machine learning model 300 deal with large input windows when handling seq2seq modeling. The attention layer 320 assigns additional focus on different inputs via a scorer 370a-d (generally, scorer 370) that aggregates the encoder hidden states 350 to identify and place greater emphasis on the key values that have a greater effect on the end prediction. In some embodiments, the outputs of the scorers 370 are softmaxed so that the total output of the scorers 370 are a scalar value (i.e., the total thereof adds up to one) to represent the attention distribution across the window w. The scalar values from the scorers 370a-d are multiplied with the corresponding encoder hidden states 350a-d to align/weight the encoder hidden states 350, to produce alignment vectors 380a-d (generally, alignment vectors 380). The alignment vectors 380 are summed to create a context vector 390, which is fed into a sixth LSTM cell 340f (in the decoder layer 330) along with the output of the fifth LSTM cell 340e to output a probability distribution for the predicted next key value.

To test if an incoming log key $m_t$ (parsed from an incoming log entry timestamped for time t) is to be considered normal or abnormal, machine learning model 300 receives inputs in the window w of $\{m_{t-h}, \ldots, m_{t-1}\}$ and outputs the probability distribution $Pr[m_t|w]=\{k_1:p_1, k_2:p_2, \ldots, k_n:p_n\}$ describing the probability (p) for each log key (k) from the set K to appear as the next log key value from time t given the history from time t−h to time t−1. In practice, multiple log key values may appear as $m_t$ and not be anomalous. The possible log keys k in the set K are therefore sorted based on their probabilities $Pr[m_t|w]$, so that the incoming log key for time t is treated as normal if that value among the top g candidates in the probability distribution, but is otherwise treated as being anomalous if outside of the top g candidates. A network operator may set the value for g so the incoming log key is compared against more or fewer predicted log keys for time t. For example, if the sorted probability distribution Pr based on the window w of $\{k_{22}, k_5, k_9, k_{11}\}$ were $\{k_{57}, k_{26}, k_{108}, k_{19}, k_{11}, \ldots k_n\}$, when g is set to 3, any of $\{k_{57}, k_{26}, k_{108}\}$ will be treated as non-anomalous for $m_t$, and when g is set to 5, any of $\{k_{57}, k_{26}, k_{108}, k_{19}, k_{11}\}$ will be treated as non-anomalous for $m_t$.

Figure 4:
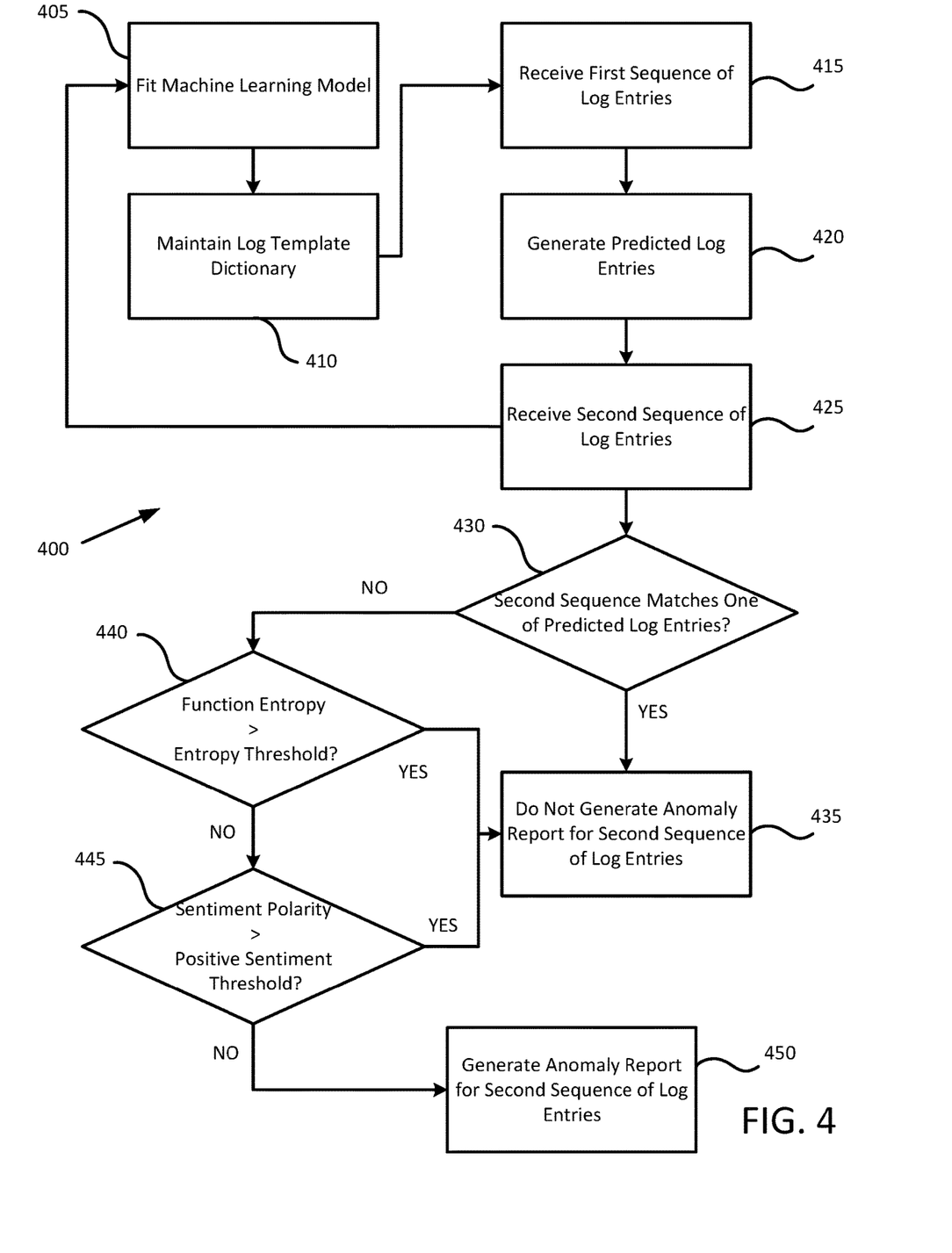
FIG. 4 is a flowchart of a method for identifying noteworthy network anomalies, according to embodiments of the present disclosure.

FIG. 4 is a flowchart of a method 400 for identifying noteworthy network anomalies, according to embodiments of the present disclosure. Method 400 begins at block 405, where an operator fits a machine learning model for a system based on the network conditions previously observed. In various embodiments, the machine learning model is an LSTM auto-encoder operating with an attention layer that is fitted with unlabeled operational logs from the system, such as that described in greater detail in regard to FIG. 3. The unlabeled operational logs can include anomalous logs and non-anomalous logs, and the anomalous logs can include both "good" and "bad" anomalies. In various embodiments, the logs can include logs for the system that the machine learning model will be deployed on that were previously observed by the system, or can be logs from a similar system (e.g., when deploying the machine learning model on a new router or muxponder, the logs can be collected from a previous router or muxponder).

At block 410, using the previously observed network logs, the operator maintains a dictionary of log templates. The dictionary stores a set of templates that are seen/executed as part of normal operations of the system being monitored. The dictionary is updated with more new "normal" templates which can include "rare" templates that were not seen as part of the initial training/fitting operations. By updating the dictionary during operations of the MLM, false positives are reduced and the MLM can evolve as the monitored system evolves.

Once the machine learning model is fitted to the network conditions and a dictionary of log templates is readied during a training phase, method 400 proceeds to block 415 and an operational deployment of the machine learning model and the dictionary. At block 415, the system receives a first sequence of actual log entries from the system. In various embodiments, the first sequence can be various lengths that include a user definable number of log entries.

At block 420, the system generates a plurality of predicted log entries for a later time after the first sequence of log entries. For example, the log entries in the first sequence can include logs from time $t_0$ to $t_x$, and the system generates one or more predictions for what the log entry at time $t_{x+1}$ will be. In various embodiments, the predicted log entries are a set of the top-n log entries from the dictionary of log templates that include those log templates with a highest probability based on the first sequence, and a user can define how many log entries to include in the set.

At block 425, the system receives the second sequence of log entries, which include a given log entry for the next time (e.g., time $t_{x+1}$), and method 400 returns to block 405 to maintain the machine learning model and proceeds to block 430 to determine whether to generate an anomaly report for the additional log entry. In some embodiments, the second sequence include the single next log entry (e.g., for time $t_{x+1}$) compared to the first sequence of log entries (from time $t_0$ to time $t_x$), but may include more log entries in other embodiments. When method 400 returns to block 405, method 400 can omit block 415 as some or all of the initial first sequence can be combined with some or all of the initial second sequence for use as a subsequent first sequence. For example, an initial first sequence from time $t_0$ to time $t_x$ can be combined with an initial second sequence of time $t_{x+1}$ to create a subsequent first sequence from time ti to time $t_{x+1}$ or from time $t_0$ to time $t_{x+1}$ among other potential combinations.

The operator maintains the machine learning model and dictionary of log templates based on changing network conditions to better recognize new templates that were once anomalous, but are now commonplace, or that where once commonplace, but are now anomalous. For example, the plurality of log templates included in the dictionary is updated during operation of the machine learning model to include new log templates observed in actual log templates from the system by adding a given log template to the plurality of templates after the given log template is observed in the operational logs a threshold number of times. In another example, the plurality of log templates included in the dictionary is updated during operation of the machine learning model to remove log templates no longer observed in actual log templates from the system by removing operational logs that were added during a particular time range (e.g., to roll back a system change, in response to detecting a security threat that was active during the time range) or that have not been observed in a given length of time (e.g., as network conditions change). Accordingly, method 400 returns to block 405 from block 425 to adjust the machine learning model (per block 405) and contents of the dictionary (per block 410) regardless of whether the second sequence of log entries (received per block 425) is anomalous or non-anomalous.

At block 430, the system determines whether the second sequence of log entries (received per block 425) is anomalous by comparing the second sequence of log entries against the top-n predicted log entries (generated per block 420). When the second sequence of log entries matches one of the top-n predicted log entries, the second sequence of log entries is determined to be non-anomalous, and method 400 proceeds to block 435. When the second sequence of log entries does not match any of the top-n predicted log entries, the second sequence of log entries is determined to be anomalous, and method 400 proceeds to block 440.

At block 435, the system does not generate an anomaly report that includes the second sequence of log entries. In various embodiments, the system may process the non-anomalous log entries as entries from a known-malicious process, or may process the non-anomalous log entries as entries from a known-benign process. When method 400 arrives at block 435 from block 430, the system does not alert an operator to the second sequence of log entries being anomalous because the second sequence of log entries was predicted (per block 420) based on the previously observed first sequence of log entries (received per block 415). When method 400 arrives at block 435 from block 440 or block 445, the system does not alert an operator to the second sequence of log entries being anomalous because, although the second sequence of log entries is anomalous, the fact that the second sequence of log entries is anomalous is not noteworthy. Stated differently, when the system judges the anomalous second sequence of log entries to be the result of a random or anomalous set of inputs (e.g., the first sequence of log entries has a high entropy) or to be recite positive, albeit unusual, network events, the system does not alert an operator to the anomalous event.

At block 440, the system determines whether the second sequence of log entries is noteworthy based on a function entropy of the first sequence of actual log templates the led up to the second sequence of log entries. As used herein, the function entropy of a series of log entries is a measure of randomness in the sequential logs. Stated differently, function entropy is a measure of the predictive power of receiving a log entry that includes function A at time $t_{x-1}$ Accordingly, differences between the predicted and actual log entries at time $t_x$ are of greater concern when function entropy for the log entries seen at time $t_{x-1}$ is low, and are of less concern when function entropy is high. Therefore, when the function entropy of the first sequence of log entries is above an entropy threshold, method 400 proceeds to block 435 as the second sequence of log entries is not noteworthy. Stated differently, if the first sequence of log entries is identified as having little predictive power (or low accuracy thereof), having the second sequence of log entries not match a predicted log entry is to be expected, and the deviation is not noteworthy. In contrast, when the function entropy of the first sequence of log entries is at or below an entropy threshold, the second sequence of log entries may be noteworthy, and method 400 continues to block 445.

In various embodiments, the entropy of the first sequence of log entries is determined based on Shannon's Entropy (H) according to Formula 1 below, where $p_i$ is the probability of entry number i appearing in the stream of entries of the message.

$$H = -\Sigma_i p_i \log_b p_i \qquad \text{[Formula 1]}$$

At block 445, the system determines whether the second sequence of log entries is noteworthy based on a sentiment polarity of the second sequence of log entries. As used herein, the polarity of a log is a measure of sentiment of the words found in the log such as negative word (e.g., violation, error, exception) or positive words (e.g., success, established, received). Anomalous positive sentiment log entries are generally of less concern than anomalous negative sentiment log entries, and thus a sentiment polarity above a positive sentiment threshold results in the system classifying the anomalous second sequence as not noteworthy, and method 400 proceeds to block 435. In contrast, a sentiment polarity at or below a positive sentiment threshold results in the system classifying the anomalous second sequence as noteworthy, and method 400 proceeds to block 450.

In various embodiments, the sentiment polarity is determined via a Vader Lexicon to extract sentimental words to determine the overall intensity of sentiment of a given log entry. The polarity score of a word lies in a range of −4 to +4, where −4 being extremely negative and +4 being extremely positive, which is normalized between −1 and +1. Neutral words, or words with no sentimental value (e.g., words common to both negative and positive events) are rated 0. If there is more than one sentiment word in a log entry, the sentiment scores are added and then normalized to obtain the compound score to maintain the normalized range between −1 and +1. The polarity score is then calculated based on to the Vader Polarity according to Formula 2, where x is the summed polarity scores of the sentimental words in the log entry and a is a user defined constant.

$$\text{Vader Polarity} = x/\sqrt{a+x^2} \qquad \text{[Formula 2]}$$

In various embodiments, the sentiment polarity threshold is set at zero, so all negative value sentiment log entries are marked as noteworthy and all neutral or positive value sentiment log entries are marked as not noteworthy. In other embodiments, the sentiment polarity threshold can be set at other values to allow some neutral and low-positive sentiment log entries to be included as noteworthy or set to mark some low-negative sentiment log entries as not noteworthy.

At block 450, the system generates an anomaly report that includes the second sequence of log entries. In various embodiments, the anomaly report is formatted according to various user preferences, but includes the second sequence of log entries and a root cause for why the second sequence was identified as anomalous. In some embodiments, the root cause analysis identifies the log entries from the first sequence that are related to the anomalous log entries from the second sequence to help identify which log entries led to the anomalous (and noteworthy) log entries. In various embodiments, the anomaly report includes several anomalous log entries and the root causes associated therewith and can rank the presentation of the anomalous log entries based on time (most recent first or last), level of anomalousness (most anomalous first or last), function entropy (most negative first or last), sentiment polarity (most negative first or last), and combinations thereof.

Figure 5:
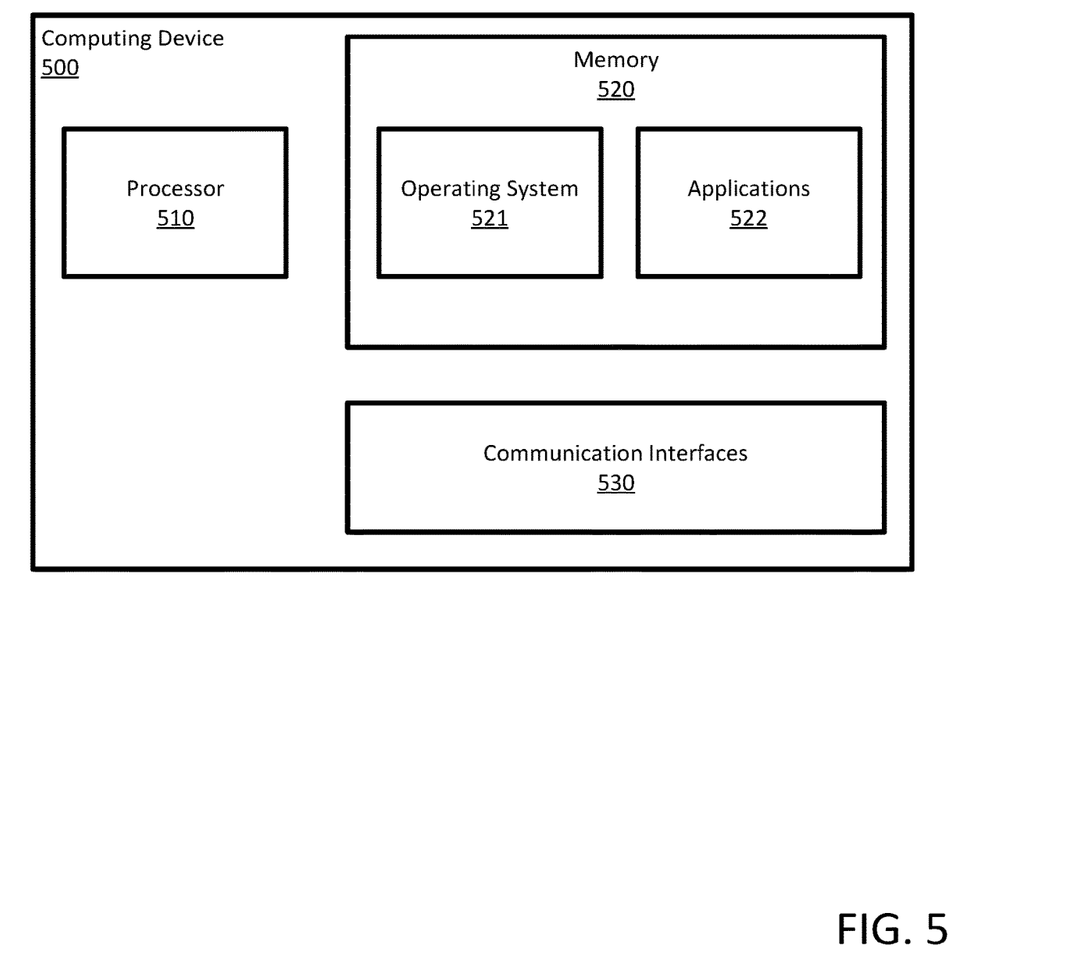
FIG. 5 illustrates hardware of a computing device, according to embodiments of the present disclosure.

FIG. 5 illustrates hardware of a computing device 500 on which a machine learning model for anomaly detection and reporting as described herein can be deployed in various embodiments. The computing device 500 includes a processor 510, a memory 520, and communication interfaces 530. The processor 510 may be any processing element capable of performing the functions described herein. The processor 510 represents a single processor, multiple processors, a processor with multiple cores, and combinations thereof. The communication interfaces 530 facilitate communications between the computing device 500 and other devices. The communication interfaces 530 are representative of wireless communications antennas and various wired communication ports including out-pins and in-pins to a microcontroller. The memory 520 may be either volatile or non-volatile memory and may include RAM, flash, cache, disk drives, and other computer readable memory storage devices. Although shown as a single entity, the memory 520 may be divided into different memory storage elements such as RAM and one or more hard disk drives.

As shown, the memory 520 includes various instructions that are executable by the processor 510 to provide an operating system 521 to manage various functions of the computing device 500 and one or more applications 522 to provide various functionalities to users of the computing device 500, which include one or more of the functions and functionalities described in the present disclosure. When provided as part of a machine learning model, the memory 520 (and/or the applications 522) may include store the dictionary of known log templates and the LSTM network and attention layer used to identify whether an incoming log is anomalous or not as well as the entropy and sentiment filters used to determine whether the incoming log is noteworthy or not.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
receiving, at a first time, a first sequence of log entries from a networked system;
generating, using a machine learning model and based on previously observed log entries including the first sequence of log entries, predicted log entries for a second time;
receiving, at the second time, a second sequence of log entries from the networked system;
determining whether the second sequence is anomalous based on comparing the second sequence with the predicted log entries;
in response to determining that the second sequence is anomalous, determining whether the second sequence is noteworthy based on a function entropy of the first sequence and a sentiment polarity of the second sequence, wherein the function entropy is a measure of randomness in the log entries, and wherein the sentiment polarity is a measure of sentiment of words found in the log entries; and in response to determining that the second sequence is noteworthy, generating an anomaly report that includes the second sequence and a root cause.

2. The method of claim 1, further comprising:
training the machine learning model based on non-anomalous log entries for the networked system;
maintaining a plurality of log templates for the log entries, wherein the plurality of log templates is updated during operation of the machine learning model to include new log templates observed in actual log templates from the networked system; and
adding a given log template to the plurality of templates after the given log template is observed in the log entries a threshold number of times.

3. The method of claim 2, wherein the machine learning model is an LSTM auto-encoder operating with an attention layer that is fitted with unlabeled operational logs from the networked system, wherein the attention layer provides a vector representation based on outputs of the LSTM auto-encoder.

4. The method of claim 2, wherein the predicted log entries are a set of log entries from the plurality of log templates with a highest probability based on the first sequence.

5. The method of claim 1, wherein the second sequence is marked as not noteworthy when the function entropy is above an entropy threshold.

6. The method of claim 1, wherein the second sequence is marked as not noteworthy when the sentiment polarity is above a positive sentiment threshold.

7. The method of claim 1, wherein the root cause identifies log entries from the first sequence related to the second sequence and the anomaly report ranks identified anomalies based on the function entropy of the first sequence and the sentiment polarity of the second sequence.

8. A system, comprising:
a processor; and
a memory including instructions that when executed by the processor perform an operation comprising:
receiving, at a first time, a first sequence of log entries from a networked system;
generating, using a machine learning model and based on previously observed log entries including the first sequence of log entries, predicted log entries for a second time;
receiving, at the second time, a second sequence of log entries from the networked system;
determining whether the second sequence is anomalous based on comparing the second sequence with the predicted log entries;
in response to determining that the second sequence is anomalous, determining whether the second sequence is noteworthy based on a function entropy of the first sequence and a sentiment polarity of the second sequence, wherein the function entropy is a measure of randomness in the log entries, and wherein the sentiment polarity is a measure of sentiment of words found in the log entries; and
in response to determining that the second sequence is noteworthy, generating an anomaly report that includes the second sequence and a root cause.

9. The system of claim 8, wherein a machine learning model determines that the second sequence is anomalous, wherein the machine learning model is an LSTM auto-encoder operating with an attention layer that is fitted with unlabeled previously observed log entries, wherein the attention layer provides a vector representation based on outputs of the LSTM auto-encoder.

10. The system of claim 9, wherein a plurality of log templates is updated during operation of the machine learning model to include new log templates observed in actual log templates, the operation further comprising:
adding a given log template to the plurality of log templates after the given log template is observed in the log entries a threshold number of times.

11. The system of claim 8, wherein the predicted log entries are a set of log entries from a plurality of log templates with a highest probability based on the first sequence.

12. The system of claim 8, wherein the second sequence is marked as not noteworthy when the function entropy is above an entropy threshold.

13. The system of claim 8, wherein the second sequence is marked as not noteworthy when the sentiment polarity is above a positive sentiment threshold.

14. The system of claim 8, wherein the root cause identifies log entries from the first sequence related to the second sequence and the anomaly report ranks identified anomalies based on the function entropy of the first sequence and the sentiment polarity of the second sequence.

15. A device including computer-readable instructions that when executed by a processor in the device enable performance of an operation comprising:
receiving, at a first time, a first sequence of log entries from a networked system;
generating, using a machine learning model and based on previously observed log entries including the first sequence of log entries, predicted log entries for a second time;
receiving, at the second time, a second sequence of log entries from the networked system;
determining whether the second sequence is anomalous based on comparing the second sequence against the predicted log entries;
in response to determining that the second sequence is anomalous, determining whether the second sequence is noteworthy based on a function entropy of the first sequence and a sentiment polarity of the second sequence, wherein the function entropy is a measure of randomness in the loci entries, and wherein the sentiment polarity is a measure of sentiment of words found in the log entries; and
in response to determining that the second sequence is noteworthy, generating an anomaly report that includes the second sequence and a root cause.

16. The device of claim 15, the operation further comprising:
training the machine learning model based on non-anomalous log entries for the networked system; and
maintaining a plurality of log templates for the log entries, wherein the plurality of log templates is updated during operation of the machine learning model to include new log templates observed in actual log entries from the networked system, further comprising:
adding a given log template to the plurality of log templates after the given log template is observed in the log entries a threshold number of times.

17. The device of claim 16, wherein the machine learning model is an LSTM auto-encoder operating with an attention layer that is fitted with unlabeled log entries from the networked system, wherein the attention layer provides a vector representation based on outputs of the LSTM auto-encoder.

18. The device of claim 16, wherein the predicted log entries are a set of log entries from the plurality of log templates with a highest probability based on the first sequence.

19. The device of claim 15, wherein the second sequence is marked as not noteworthy when the function entropy is above an entropy threshold.

20. The device of claim 15, wherein the second sequence is marked as not noteworthy when the sentiment polarity is above a positive sentiment threshold.

* * * * *

UNITED STATES PATENT AND TRADEMARK OFFICE
CERTIFICATE OF CORRECTION

| | | |
|---|---|---|
| PATENT NO. | : 11,336,507 B2 | Page 1 of 1 |
| APPLICATION NO. | : 17/039529 | |
| DATED | : May 17, 2022 | |
| INVENTOR(S) | : Prasenjeet Acharjee et al. | |

It is certified that error appears in the above-identified patent and that said Letters Patent is hereby corrected as shown below:

On the Title Page

On page 2, in Column 2, under "Other Publications", Line 17, delete "Computerand" and insert -- Computer and --.

In the Specification

In Column 2, Line 31, delete "time;" and insert -- time, --.

In Column 6, Line 19, delete "$k_1 \in K$" and insert -- $k_i \in K$ --.

In Column 6, Line 22, delete "$Pr(m_t=m_{t-h}, \ldots, m_{t-2}, m_{t-1})$" and insert -- $Pr(m_t=k_i|m_{t-h}, \ldots, m_{t-2}, m_{t-1})$ --.

In Column 7, Line 24, delete "$\{k_{22}, k_5, k_9, k_{11}\}$" and insert -- $\{k_{22}, k_5, k_{11}, k_9, k_{11}\}$ --.

In the Claims

In Column 14, Line 50, in Claim 15, delete "loci" and insert -- log --.

Signed and Sealed this
Twenty-third Day of August, 2022

*Katherine Kelly Vidal*

Katherine Kelly Vidal
*Director of the United States Patent and Trademark Office*